US007425876B2

(12) United States Patent
Ogawa et al.

(10) Patent No.: US 7,425,876 B2
(45) Date of Patent: Sep. 16, 2008

(54) ANTENNA SWITCH CIRCUIT AND HIGH FREQUENCY MODULE HAVING THE SAME

(75) Inventors: Takashi Ogawa, Tokyo (JP); Shinichiro Takatani, Koganei (JP); Akishige Nakajima, Higashiyamato (JP); Yasushi Shigeno, Maebashi (JP); Eigo Tange, Takasaki (JP)

(73) Assignee: Renesas Technology Corp., Tokyo (JP)

( * ) Notice: Subject to any disclaimer, the term of this patent is extended or adjusted under 35 U.S.C. 154(b) by 217 days.

(21) Appl. No.: 11/178,312

(22) Filed: Jul. 12, 2005

(65) Prior Publication Data

US 2006/0061434 A1    Mar. 23, 2006

(30) Foreign Application Priority Data

Sep. 17, 2004   (JP)   ............................. 2004-271048

(51) Int. Cl.
*H01P 1/10* (2006.01)
*H01P 1/15* (2006.01)
(52) U.S. Cl. ...................................... 333/103; 333/101
(58) Field of Classification Search ................. 333/101, 333/103; 257/275
See application file for complete search history.

(56) References Cited

U.S. PATENT DOCUMENTS 6,653,697 B2 * 11/2003 Hidaka et al. ............... 257/393
7,199,635 B2 * 4/2007 Nakatsuka et al. .......... 327/308

FOREIGN PATENT DOCUMENTS

JP          10-178305          6/1998

* cited by examiner

*Primary Examiner*—Dean O Takaoka
(74) *Attorney, Agent, or Firm*—Miles & Stockbridge P.C.

(57) ABSTRACT

An object of the present invention is to provide an antenna switch circuit that effectively reduces signal leakages at a cross point even at higher operating frequencies and a high frequency module containing said antenna switch module. The antenna switch circuit comprises: a high frequency signal line to transmit a transmitting signal to be input to transmitting terminals to an antenna terminal and also to transmit a receiving signal to be input to the antenna terminal to receiving terminals; switches that are connected in the middle of the high frequency signal line between transmitting terminal and antenna terminal; switches that are connected in the middle of the high frequency signal line between receiving terminal and antenna terminal; and signal lines to transmit control signals for controlling turning on and off of the switches.

10 Claims, 5 Drawing Sheets

ANTENNA SWITCH CIRCUIT AND HIGH FREQUENCY MODULE HAVING THE SAME

CLAIM OF PRIORITY

The present application claims priority from Japanese application JP 2004-271048 filed on Sep. 17, 2004, the content of which is hereby incorporated by reference into this application.

FIELD OF THE INVENTION

The present invention relates to an antenna switch circuit for switching the connection to a common antenna between a transmitter circuit and a receiver circuit, and a high frequency module containing said antenna switch circuit.

BACKGROUND OF THE INVENTION

As the circuits of a mobile phone are increasingly integrated, the thickness of a wiring substrate formed of layered dielectric plates becomes thinner. As a result, if a high frequency signal line is crossed with another signal line over a layer of the wiring substrate, both signal lines come close to each other at the cross point.

At the cross point where both signal lines come close to each other, a combined capacitance is formed by both wiring layers and an insulating material in between. Since the frequencies of the high frequency signals used for a mobile phone are in the GHz band, it is inevitable that the high frequency signals leak to other signal lines through this combined capacitance. The patent document 1 below discloses an example in which resistive elements are disposed immediately under and across the high frequency signal line so that other signal lines pass through the resistive elements, in order to reduce the leakage.

Patent document 1: JP-A No. 10-178305

SUMMARY OF THE INVENTION

In a mobile phone, a common antenna is used for transmission and reception and therefore an antenna switch circuit is provided to switch the connection to the antenna between a transmitting circuit and a receiving circuit. Particularly, in a multi-mode mobile phone supporting a plurality of standards, plural transmitting and receiving circuits are provided and the antenna switch circuit is formed such that the connection to the common antenna can be switched among the plurality of transmitting and receiving circuits. In such a case, many switching devices are used and high frequency signal lines to the antenna or those to receiving terminals cross with control signal lines that control the turning on and off of the switching devices, and cross points are formed there.

The antenna switch circuit is typically formed by an integrated circuit. As the integration of an integrated circuit is increased, the gap between these signal lines at a cross point becomes narrower. Since an interlayer insulating film is formed at the cross point, a capacitance is formed between the signal lines with the interlayer insulating film acting as a dielectric material. The higher the frequency, the more notable the effect of this capacitance. If transmitting high frequency signals leak through this combined capacitance, power efficiency will be reduced. If receiving high frequency signals leak, receiving sensitivity will be lowered. Moreover, signals that leaked at a cross point may further leak to the receiving signal lines via other cross points or other switch devices.

For the multi-mode mobile phone equipped with a battery and operates at high frequencies in GHz band, lower power consumption and higher sensitivity are required. In order to meat these requirements, a decrease in insertion loss between each of the transmitting and receiving circuits and the antenna and high Tx isolation, Rx isolation, and Tx, Rx isolation are required.

The conventional method of disposing resistive elements at a cross point can reduce the leakage, but capacitances are combined at the resistive elements across the cross point and consequently the resistance decreases equivalently at high frequencies and the effect of leakage reduction lowers.

Furthermore, the conventional method has a problem that the width of a resistive element formed at the cross point with a control signal line changes according to the width of a high frequency signal line. For example, when the sheet resistance is 100 Ω/□ and the width of the high frequency signal line is limited to 500 μm by allowable current, if the width of the resistive element is 10 μm, then the resistive element at the cross point is 10 μm wide, 500 μm long, and at 5 kΩ. When the width of the high frequency signal line is 5 μm, if the width of the resistive element is 10 μm, then the resistive element at the cross point is 10 μm wide, 5 μm long, and at 50 Ω. Thus, the resistance changes with the change in the effect of leakage reduction. Moreover, if the gap between signal lines at a cross point narrows, a high frequency signal line through which high-power transmitting signals flow may generate joule heat at the resistive element since the leaked signals flow through the resistive element.

An object of the present invention is therefore to provide an antenna switch circuit that effectively reduces the leakage of signals even if the operating frequency becomes higher, or to provide a high frequency module containing said antenna switch.

The antenna switch circuit of the present invention for achieving the above object comprises: a first signal line to transmit a transmitting signal to be input to a transmitting terminal to an antenna terminal and also to transmit receiving signal to be input to the antenna terminal to a receiving terminal; a first switch connected in the middle of the first signal line between the transmitting terminal and the antenna terminal; a second switch connected in the middle of the first signal line between the receiving terminal and the antenna terminal; a second signal line to transmit a first control signal that controls the turning on and off of said first switch; and a third signal line to transmit a second control signal that controls the turning on and off of said second switch, wherein at least either of said second and third signal lines crosses with the first signal line, two resistive elements are disposed across a cross point with said first signal line, and at least either of said second and third signal lines crossing with said first signal line is wired through said two resistive elements.

In the construction above, signals that leaked at the cross point is blocked by the two resistive elements and thereby the leakage is reduced. Also, since the resistive elements are not disposed immediately under the cross point, the leakage reducing effect will not be impaired. As a result, the leakage is effectively reduced and the requirements for reduced insertion loss and higher Tx, Rx isolation can be met.

A high frequency module of the present invention for achieving the above object comprises: a transmitting circuit that outputs a transmitting signal; a receiving circuit that inputs a receiving signal from an antenna terminal; and an antenna switch circuit that supplies an output signal from the transmitting circuit to the antenna terminal during transmission and supplies a receiving signal from the antenna terminal to the receiving circuit during reception, wherein the antenna switch circuit is said antenna switch circuit. Since the antenna switch circuit enables reduced insertion loss and high and reliable Tx, Rx isolation, thus making it possible to realize a high frequency module with high performance.

According to the present invention, current leakage is suppressed by the resistive elements which are disposed away from and across the cross point, not at the cross point, and thereby signal leakage can be effectively reduced.

DETAILED DESCRIPTION OF THE PREFERRED EMBODIMENTS

Figure 1:
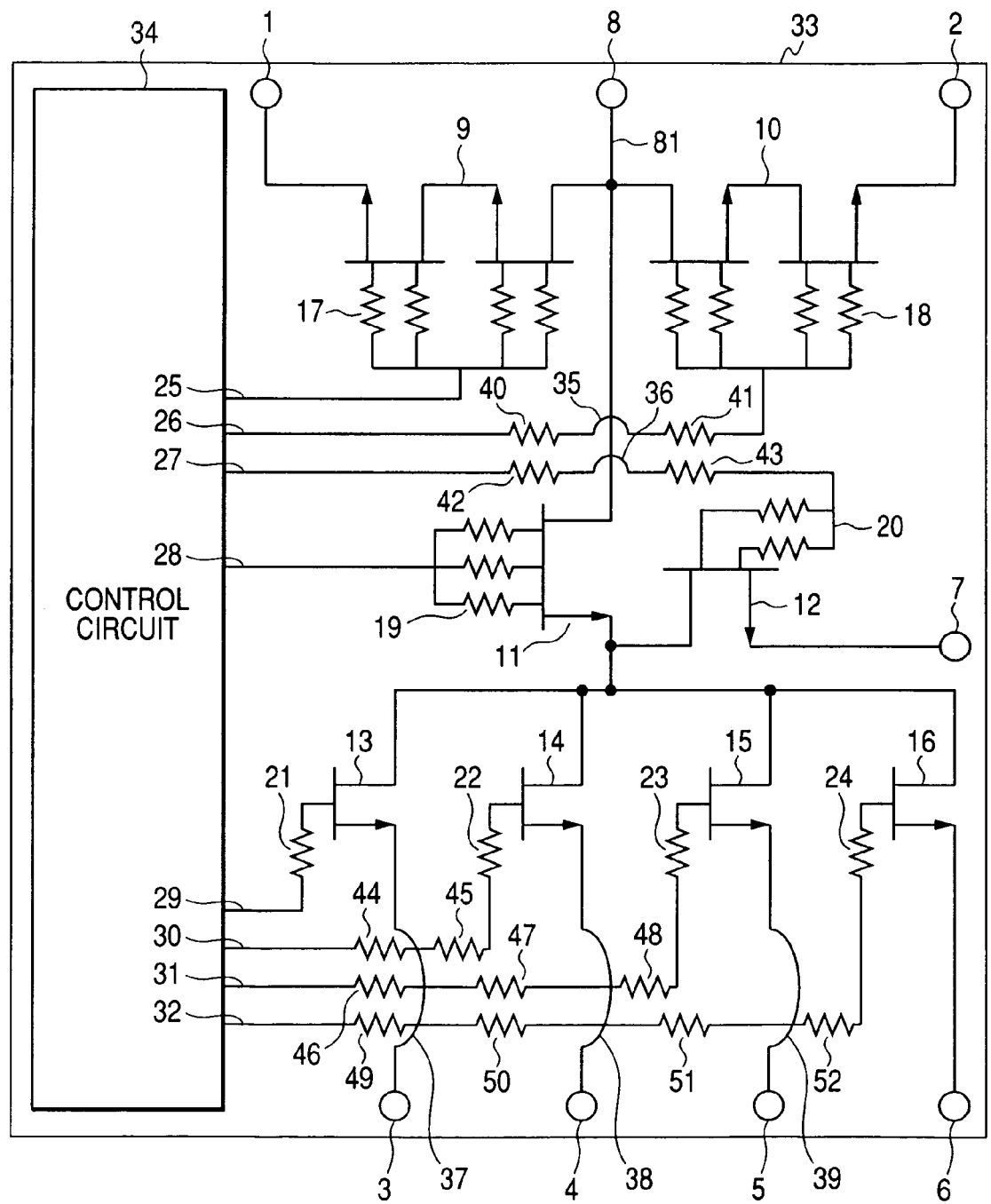
FIG. 1 a schematic diagram for illustrating an embodiment of an antenna switch circuit according to the present invention.

With reference to the embodiments shown in the drawings, an antenna switch circuit according to the present invention or a high frequency module containing said antenna switch circuit will be described below. The same reference numbers in FIGS. 1 to 4 denote the same or similar items, and therefore repeated descriptions of them will not be made.

FIG. 1 shows an embodiment of the antenna switch according to the present invention. In this figure, 9 and 10 denote switches (first switches) which connect transmitting terminals 1 and 2 to an antenna terminal 8 respectively, 11 is a switch which turns on when receiving and off when transmitting, 12 is a switch that turns off when receiving and on when transmitting for connection with a high frequency ground terminal 7, and 13 to 16 are switches (second switches) that connect receiving terminals 3 to 6 to the antenna terminal 8 respectively via a switch 11. Furthermore, in FIG. 1, 81 denotes a high frequency signal line (a first signal line) for transferring transmitting signals that are input to the transmitting terminals 1 and 2 to the antenna terminal 8 and also for transferring received signals that are input to the antenna terminal 8 to the receiving terminals 3 to 6, 34 is a control circuit which generates a control voltage for controlling the gate of each switch to turn on or off, and 33 is the antenna switch circuit comprising the switches 9 to 16 and the control circuit 34. In this configuration, the switches 9 and 10 are connected in the middle of the high frequency signal line 81 connecting the transmitting terminals 1 and 2 and the antenna terminal 8 respectively, and the switches 11 and 13 to 16 are connected in the middle of the high frequency signal line 8 connecting the receiving terminals 3 to 6 and the antenna switch 8 respectively. Thus, the antenna switch circuit 33 selectively connects the antenna terminal 8 to one of the terminals 1 to 6. The number of switches given here is only an example and the present invention is not restricted to this number.

Each of the switches 9 to 16 is composed of an FET (Field Effect Transistor) device, and electrical conduction between the drain and source is controlled by a control voltage applied to the gate.

The switches 9 and 10 are each composed of two stage dual-gate transistors in order to deal with an electric power exceeding 1 W. This halves the voltage to be applied to one transistor. The switches 9 and 10 may also be composed of multi stage single-gate transistors or triple-gate transistors for dividing the voltage to be applied.

The switch 11 is composed of a one stage triple-gate transistor, the switch 12 is composed of a one stage dual-gate transistor, and the switches 13 to 16 are each composed of a one stage single-gate transistor. The antenna switch circuit 33 includes these switches and the control circuit 34, all of which are integrated by the semiconductor process on a semi-insulating substrate of compound semiconductor to form a single-chip semiconductor integrated circuit. The control circuit 34 may be formed on a different chip from the one on which the switch circuit 33 is formed.

Control of each switch is made by a control voltage to be output from the control circuit 34, i.e. an ON voltage to turn on the switch and an OFF voltage to turn off the switch, via each of control signal lines 25 to 32 connected to the gate of each switch. Each of resistors 17 to 24 inserted in each control signal line is used to prevent a high frequency signal that is input from the drain or source of the FET switch from leaking from the gate.

One end of each of the control signal lines 25 to 32 used to control the switches 9 to 16 is connected to each of the resistors 17 to 24, and the other end is wired to the control circuit 34 side. Since a high frequency ground terminal 7 must be connected to a ground terminal external to the antenna switch circuit 33 chip by the shortest route, the ground terminal 7 is disposed on the opposite side of the control circuit 34.

In this construction, there are cross points 35, 36, 37, 38, and 39 where the control signals 26, 27, and 30 to 32 cross with the high frequency signal line 81 respectively. Resistive elements 40 and 41 are inserted in the control signal line 26 (a second signal line) across the cross point 35, and resistive elements 42 and 43 are inserted in the control signal line 27 across the cross point 36. Also, across the cross point 37, resistive elements 44 and 45 are inserted in the control signal line 30 (a third signal line), resistive elements 46 and 47 in the control signal line 31, and resistive elements 49 and 50 in the control signal line 32. Furthermore, across the cross point 38, resistive elements 47 and 48 are inserted in the control signal line 31 and resistive elements 50 and 51 in the control signal line 32, and across the cross point 39 resistive elements 51 and 52 is inserted in the control signal 32.

Figure 2:
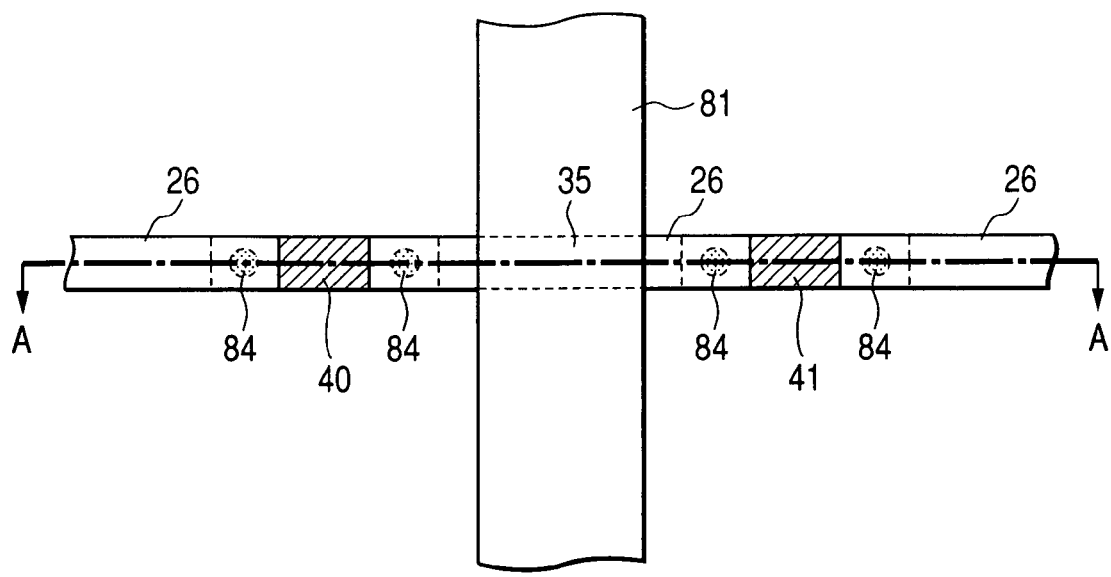
FIG. 2 is a plan view of a cross point for illustrating its structure.
Figure 3:
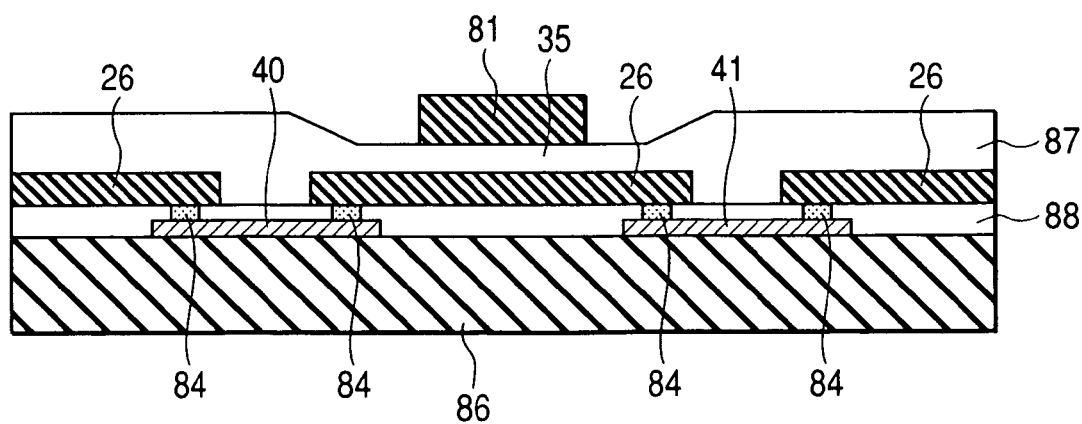
FIG. 3 is a sectional view of the cross point for illustrating its structure.

Since these elements are formed on the same chip by the semiconductor process, interlayer insulating film made of dielectric film is filled between the wires at a cross point. FIGS. 2 and 3 shows such cross point 35 and the surrounding structure. FIG. 2 is a plan view of the cross point 35 and FIG. 3 is a cross-sectional view of FIG. 1 cut along the line A-A. The control signal line 26 is formed in the interlayer insulating film 87 that is formed on the semi-insulating substrate 86, the resistive elements 40 and 41 are formed in the interlayer insulating film 88, and the high frequency signal line 81 is formed on the interlayer insulating film 87. The resistive elements 40 and 41 are connected to the control signal line 26 by means of a plug 84. The cross point 35 is formed between the high frequency signal line 81 and the control signal line 26 in the interlayer insulating film 87. Thus, the resistive elements 40 and 41 are disposed away from and across the cross point 35. The other cross points 36, 37, 38, and 39 and their surrounding areas are similarly configured.

Figure 4:
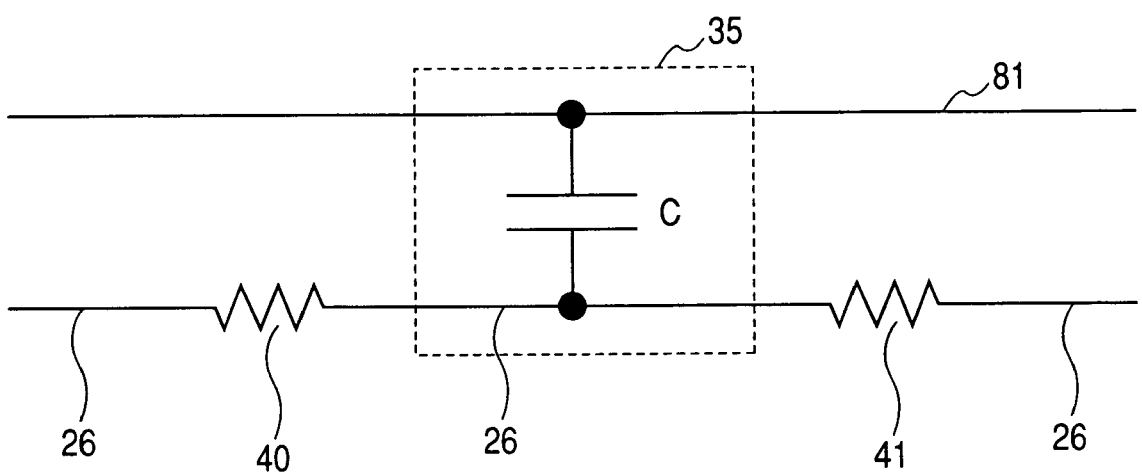
FIG. 4 is a circuit diagram showing an electrical equivalent circuit of the cross point.

FIG. 4 shows an electrical equivalent circuit of the cross point 35 and its surrounding area. The high frequency signal line 81 is connected to the control signal line 26 in which the resistive elements 40 and 41 are disposed via a coupling capacitance C. A signal which leaks through the coupling capacitance C is blocked by the resistive elements 40 and 41.

The effect of decreasing signal leaks according to the present invention will be described below, for the case where the control circuit 34 exists on the same circuit.

First, during the transmission, when a transmitting signal is input to the transmitting terminal 1, the control circuit 34 outputs voltages to turn on the switches 9 and 12 and turn off the switches 10, 11, and 13 to 16. At this time, the transmitting signal leaks from the cross points 35 and 36 between the high frequency signal line 81 and the control signal lines 26 and 27 respectively to the control signal lines 26 and 27, via the interlayer insulating film over the cross points 35 and 36.

Without the resistive elements 40 and 41 at the cross point 35, the leaked high frequency signal will further leaks to the gate side of the switch 10 and the control circuit 34 side. If all of the resistive elements 18 have the same resistance, the combined resistance when seen from the control signal line 26 is about ¼ thereof, thus making the transmitting signal easy to leak. Furthermore, since a bypass capacitance is connected to each control signal line of the control circuit 34, the control circuit 34 is short-circuited to the high frequency signal and thereby the high frequency signal is easy to leak. These cause insertion loss deterioration between the transmitting terminal 1 and the antenna terminal 8.

Without the resistive elements 42 and 43 at the cross point 36, the leaked high frequency signal will further leaks to the gate side of the switch 12 and the control circuit 34 side. There are two resistors 20 at the gate side of the switch 12. If these resistors have the same resistance the combined resistance when seen from the control signal line 27 is ½ thereof, thus making the high frequency signal easy to leak to the drain side of the switch 12, i.e. the source side of the switch 11, and the terminal 7 side. Moreover, since the control circuit 34 is short-circuited to the high frequency signal and thereby the high frequency signal is easy to leak, as mentioned above. As a result, if the high frequency signal leaks to the control circuit 34 or the terminal 7 side, insertion loss deterioration occurs between the terminal 1 and the antenna terminal 8, and if leaks to the source side of the switch 11, isolation deterioration occurs between transmission and reception.

When the switch 10 is on and the switch 9 is off, if the resistive elements 42 and 43 are not inserted at the cross point 36, insertion loss deterioration is caused between the transmitting terminal 2 and the antenna terminal 8 and isolation deterioration occurs between transmission and reception, as described above. At the cross point 35, if the resistive elements 40 and 41 are not provided, a transmitting signal leaks to the control circuit 34 side and the switch 9 side. The control circuit 34 is short-circuited by a bypass capacitance and thereby a transmitting signal is easy to leak, thus resulting in insertion loss deterioration between the transmitting terminal 2 and the antenna terminal 8.

As shown in FIG. 1, providing the resistive elements 40, 41, 42, and 43 causes the control circuit 34 side and the gate side of the switch 10, when seen from the cross points 35 and 37, to be at high impedance and therefore the high frequency signal is hard to leak, thus preventing insertion loss deterioration or isolation deterioration.

Now, what happens to a signal input to the receiving terminal 4 from the receiving antenna terminal 8 will be described. The switches 9, 10, 12, 13, 15, and 16 are turned off and the switches 11 and 14 turned on by the control circuit 34, and a receiving signal input from the antenna terminal 8 is output to the receiving terminal 4 via the switches 11 and 14. At this time, the signal deteriorates in performance at the cross points 35, 36, and 38 between the high frequency signal line 81 and the control signal lines 26, 27, 30, 31, and 32.

The control circuit 34 side is short-circuited to the cross points 35 and 36, thereby causing the high frequency signal to leak, which results in deteriorated insertion loss. However, providing the resistive elements 40 and 42 causes the control circuit 34 side to be at high impedance and thereby prevents insertion loss deterioration.

If the resistive elements 46 to 52 are not provided for the cross points 38, insertion loss deterioration due to a leakage to the bypass capacitance at the control circuit 34 side becomes a problem. Also, isolation deterioration between the receiving terminals 4 and 3, between the receiving terminals 4 and 5, and between the receiving terminals 4 and 6 becomes a problem, which is caused by the leakage of a receiving signal to the high frequency wiring which connects the switch 13 and the receiving terminal 3 via the control signal lines 30 to 32 and the cross points 37 to 39, the high frequency wiring which connects the switch 15 and the receiving terminal 5, or the high frequency wiring which connects the gate of the switch 16 and receiving terminal 6 at the source side.

The resistive elements 47 and 50 suppresses the leakage to the control circuit 34 side and thereby prevents insertion loss deterioration and the leakage of a receiving signal to the high frequency wiring which connects the switch 13 and the receiving terminal 3. The resistive elements 48 and 51 prevents a the leakage of a receiving signal to the high frequency wiring which connects the switch 15 and the receiving terminal 5, the leakage of a receiving signal from the gate of the switch 16 to the receiving terminal 6, and the isolation deterioration between the receiving terminals 4 and 3, the receiving terminals 4 and 5, and the receiving terminals 4 and 6.

When a signal is input to the receiving terminal 3 from the antenna terminal 8, the switches 9, 10, 12, and 14 to 16 are turned off and the switches 11 and 13 are turned on by the control circuit 34, and the receiving signal that is input from the antenna 8 is output to the receiving terminal 3 through the switches 11 and 13.

At this time, the insertion loss deterioration is suppressed by the resistive elements 40 and 42 as in the case of receiving at the receiving terminal 4.

For the cross point 37, if the resistive elements 44 to 47, 49, and 50 are provided, a receiving signal leaks to the bypass capacitance of the control circuit 34 via the control signal lines 30 to 32 and thereby the insertion loss is deteriorated. Also, a receiving signal leaks to the high frequency wiring which connects the switch 14 and the receiving terminal 4 via the control signal lines 30 to 32. This deteriorates the Rx isolation, but the resistive elements 44, 46, 49, 47, and 50 causes the control circuit 34 side when seen from the cross point 37 and the high frequency wiring side connecting the switch 14 and the receiving terminal 4 to be at high impedance, which prevents the leakage of a receiving signal and suppresses performance deterioration. Similarly, the leakage of a receiving signal to the high frequency wiring which connects the switch 15 and the receiving terminal 5 and that from the gate of the switch 16 to the receiving terminal 6 can be prevented.

This also applies to the receiving with the antenna terminal 8 and the receiving terminal connected and that with the antenna terminal 8 and the receiving terminal 6 connected.

As described above, according to this embodiment, leak current is suppressed by the resistive elements disposed away from and across the cross point and thereby signal leakage is effectively reduced, thus making it possible to reduce insertion loss and to ensure high isolation. Also, generation of joule heat can be suppressed that may occur when a resistive element is placed immediately under the cross point.

Depending on the amount of signal leakage at the cross point, it is possible to dispose the resistive elements across either of the cross points 41 and 43 or the cross points 37 to 39.

Figure 5:
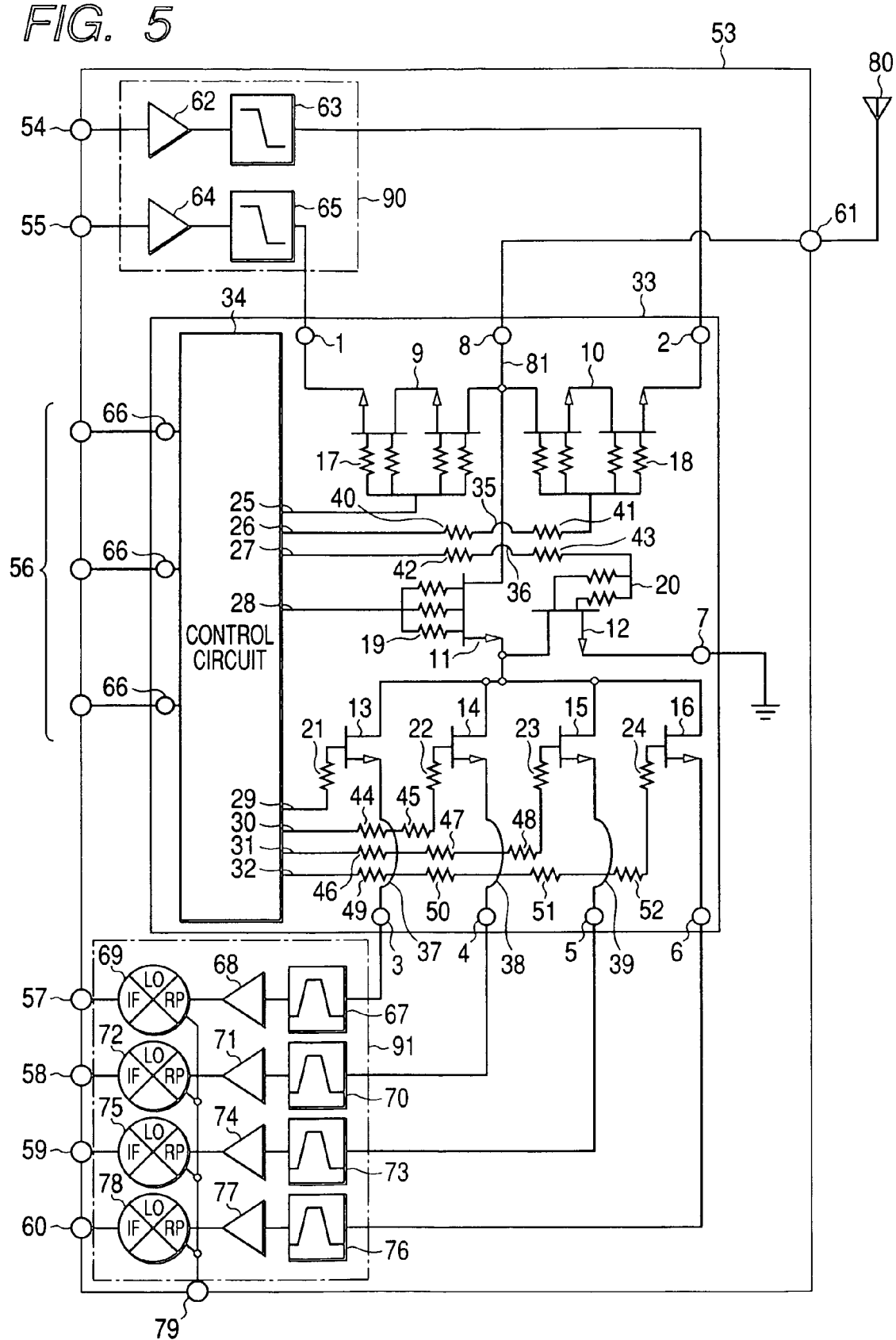
FIG. 5 is a schematic diagram for illustrating an embodiment of a high frequency module according to the present invention.

FIG. 5 shows an embodiment of the high frequency module containing the antenna switch circuit according to the present invention. The module of this embodiment is a transmitting and receiving module for a quad band mobile phone. The quad band consists of the four mobile phone standards: GSM (Global System for Mobile communications) used in Europe, GSM, PCS (Personal Communication Services), and DCS (Digital Communication System), the latter three are used in the U.S. The present invention is not restricted to these standards. For convenience, GSM used in Europe is called GSM1 and GSM in the U.S. GSM2 herein. Since GSM uses 900 MHz band and PCS and DCS use 1800 MHz band, the high frequency module 53 is equipped with a transmitting signal input terminal 54 which is common to GSM1 and GSM2, and a transmitting signal input terminal 55 which is common to PCS and DCS. Furthermore, the module 53 is provided with a control terminal 56, a PCS receiving terminal 57, a DCS receiving terminal 58, a GSM1 receiving terminal 59, a GSM2 receiving terminal 60, and an antenna terminal 61.

To the transmitting terminal 54 the input terminal of a power amplifier circuit 62 for GSM1/2 is connected, and to the input terminal thereof the input terminal of a low pass filter 65 is connected that eliminates higher harmonics to be output from the power amplifier circuit 62. To the output terminal thereof the terminal 2 of a switch circuit 33 is connected.

To the transmitting terminal 55 the input terminal of a power amplifier circuit 64 for PCS/DCS is connected, and to the output terminal thereof a low pass filter 65 is connected that eliminates higher harmonics to be output from the power amplifier circuit 64. To the output terminal thereof the terminal 1 of the switch circuit 33 is connected.

The power amplifier circuits 62 and 64 and the low pass filters 63 and 65 make up a transmitting circuit 90. According to the present invention, the transmitting circuit 90 is not restricted to this configuration.

To the control terminal 56, a control terminal 66 of the control circuit 34 in the switch circuit 33 is connected.

To the terminal 3 of the switch circuit 33, the input terminal of a SAW (Surface Acoustic Wave) filter 67 is connected that eliminates noises and spurious signals other than the PCS receiving frequency band, and to output terminal thereof the input terminal of a low noise amplifier circuit 68 for PCS is connected. To the output terminal thereof the RF (Radio Frequency) input terminal of a mixer (LO) 69 is connected, and the IF (Intermediate Frequency) output terminal is connected to the receiving terminal 57 of the module 53.

To the terminal 4 of the switch circuit 33 the input terminal of a SAW filter 70 is connected that eliminates noises and spurious signals other than DCS receiving frequency band, and to the output terminal thereof the input terminal of a low noise amplifier circuit 71 for DCS is connected. To the output terminal thereof the RF terminal of a mixer 72 is connected, and the IF output terminal is connected to the receiving terminal 58 of the module 53.

To the terminal 5 of the switch circuit 33 the input terminal of a SAW filter 73 is connected that eliminates noises and spurious signals other than GSM1 receiving frequency band, and to the output terminal thereof the input terminal of a low noise amplifier circuit for GSM1 is connected. To the output terminal thereof the RG input terminal of a mixer 75 is connected, and the IF output terminal is connected to the receiving terminal 59 of the module 53.

To the terminal 6 of the switch circuit 33 the input terminal of a SAW filter 76 is connected that eliminates noises and spurious signals other than GSM2 receiving frequency band, and to the output terminal thereof the input terminal of a low noise amplifier circuit for GSM2 is connected. To the output terminal thereof the RG input terminal of a mixer 78 is connected, and the IF output terminal is connected to the receiving terminal 60 of the module 53.

The local terminal of the mixers 69, 72, 75, and 78 are connected to the terminal 79 of the module 53.

The low noise amplifier circuits 68, 71, 74, and 77, the SAW filters 67, 70, 73, and 76, and the mixers 69, 72, 75, and 78 make up a receiving circuit 91. According to the present invention, the receiving circuit 91 is not restricted to this configuration.

The above sections are mounted on a module substrate to form the module 53, and the antenna 80 is connected to the antenna terminal 61 of the module 53.

Since the module 53 is applied to a mobile terminal and supports a plurality of communication standards, improved power efficiency at the transmitting side, i.e. low insertion loss of the switch circuit 33, low insertion loss at the receiving side, and high Rx isolation are required.

Furthermore, since the transmitting frequencies of PCS band and the receiving frequencies of DCS band have overlapped operating frequencies in the range from 1850 to 1875 MHz, if a PCS transmitting signal in this band is output, the power that is input to the SAW filter 70 is determined by the isolation between PCS transmission and DCS reception. At this time, the SAW filter is unable to eliminate the PCS transmitting signals and also the SAW filter 70 may be destroyed due to over-input power, which may lead to destruction of the low noise amplifier circuit 71. Since the power resistance of the SAW filter is approximately 0 dBm and the maximum transmitting power of the PCS transmitter is 34.5 dBm, 36 dB or more isolation is required with a margin of 1.5 dB. The operation of the switch circuit was described in detail with reference to FIG. 1, so no description is made here.

Now, an advantage of the present invention will be described taking the case of PCS transmission as an example. During the PCS transmission, a signal is input from the control terminal 56 to the terminal 66 of the control circuit 34. The control circuit 34 is a decoder circuit, and apply voltages to the control signal lines 25 to 32 to turn on the switches 9 and 12 and turn off the switches 10, 11, and 13 to 16 according to the combination of signals input to the terminal 66. The PCS transmitting signal input to the terminal 55 is amplified to a desired transmitting power by the power amplifier circuit 64, higher harmonics are eliminated by the filter 65, and is input to the terminal 1 of the switch 33. The PCS transmitting signal is radiated from the antenna 80 via the switch 9, terminal 8, and terminal 61.

Figure 6:
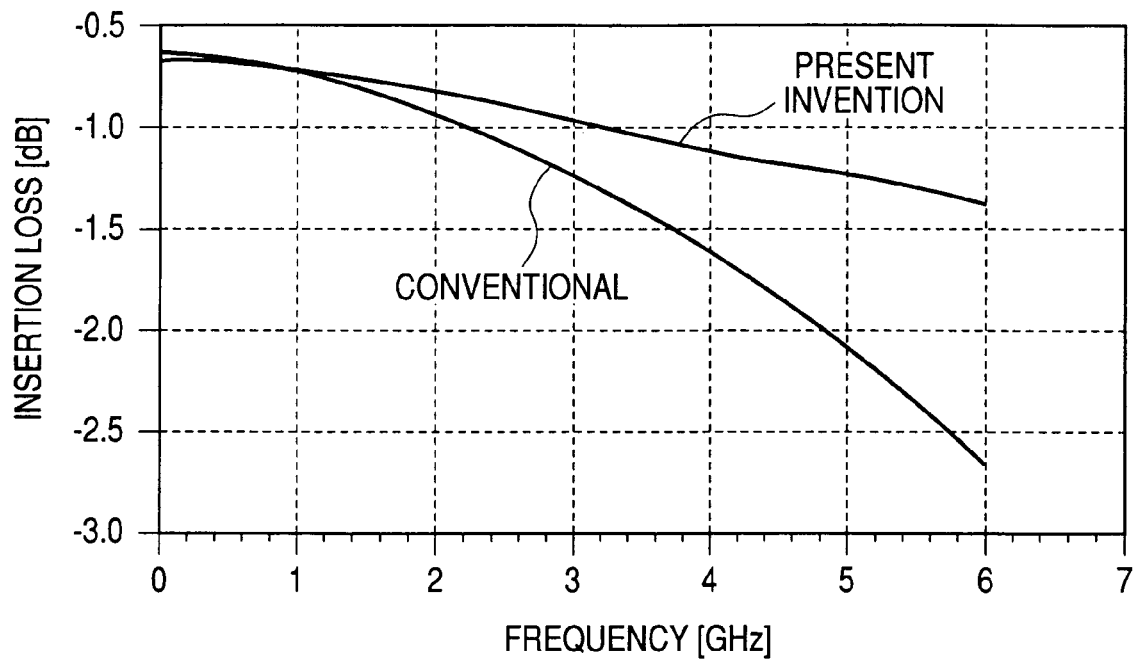
FIG. 6 is a graph for illustrating the effect of the present invention on insertion loss.
Figure 7:
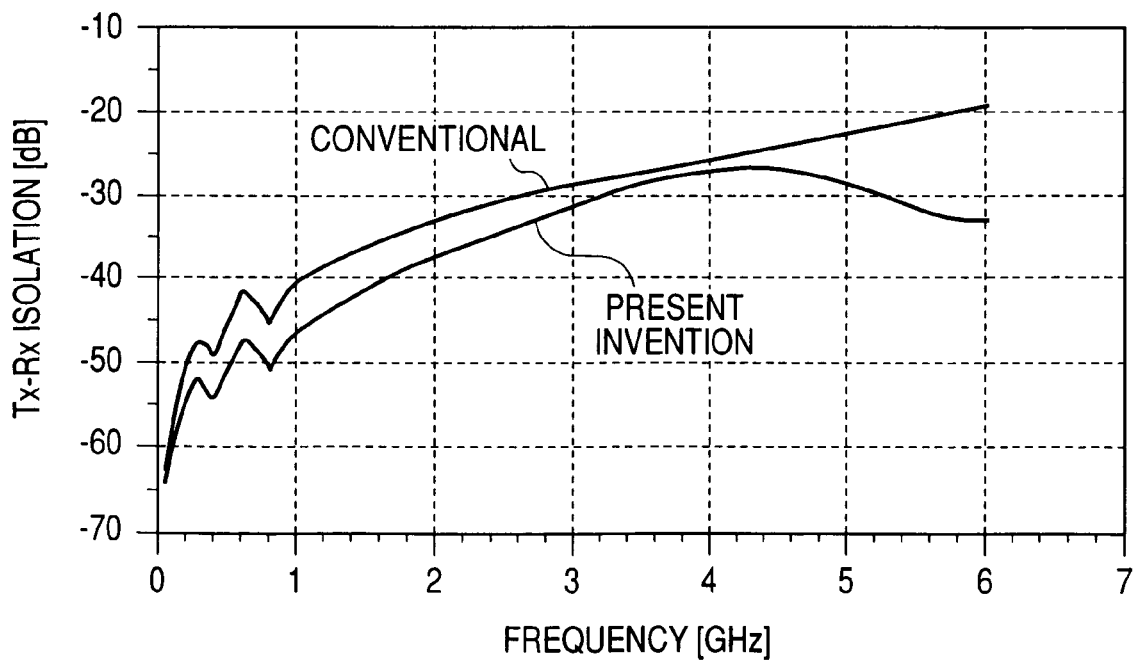
FIG. 7 is a graph for illustrating the effect of the present invention on Tx, Rx isolation.

At this time, if the resistive elements 40, 42, and 43 are not provided, some of the PCS transmitting signals leak to the control circuit 34 side and the gate side of the switch 12 at the cross points 35 and 36. Assuming that the area of the cross point is 300 $\mu m^2$, the thickness of the interlayer insulating film 0.5 $\mu m$, and the specific inductive capacity 3.8, the capacitance at the cross point will be 0.2 pF. The insertion loss obtained from this is shown in FIG. 6 and the Tx, Rx isolation is shown in FIG. 7. The insertion loss in this case will be 0.9 dB at 1.91 GHz.

In contrast, if the resistive elements 40, 42, and 43 are provided according to the present invention, the insertion loss becomes 0.8 dB and therefore insertion loss deterioration can be reduced. The power efficiency will be increased about 2.3% due to the reduction of 0.1 dB in insertion loss at the transmitting side.

The Tx, Rx isolation for the band where the frequencies of PCS transmission and DCS reception are overlapped was 33 dB without the resistive elements 40, 42, and 43. However, providing the resistive elements 40, 42, and 43 according to the present invention has improved by 5 dB to 38 dB. This improvement of 5 dB in Tx, Rx isolation ensures a sufficient margin in the destruction voltage resistance of the SAW filter 70.

This embodiment has realized the prevention of the deterioration of insertion loss and isolation while supporting the plurality of communication standards.

What is claimed is:

1. An antenna switch circuit comprising:
a first signal line to transmit a transmitting signal received at a transmitting terminal to an antenna terminal and to transmit a receiving signal received at the antenna terminal to a receiving terminal;
a first switch that is connected to the first signal line between the transmitting terminal and the antenna terminal;
a second switch that is connected to the first signal line between the receiving terminal and the antenna terminal;
a second signal line to transmit a first control signal that controls the turning on and off of said first switch; and
a third signal line to transmit a second control signal that controls the turning on and off of said second switch,
wherein at least one of said second and third signal lines crosses the first signal line;
in at least one of said second and third signal lines, a first resistive element is disposed on a first side of a cross point with said first signal line and a second resistive element is disposed on a second side of the cross point, the second resistive element being disposed between the cross point and a control circuit that outputs the corresponding one of the first and second control signals; and
the at least one of said second and third signal lines that are crossing with said first signal line includes a conductive path through said first and second resistive elements.

2. The antenna switch circuit according to claim 1, wherein said first and second switches are composed of field effect transistors.

3. The antenna switch circuit according to claim 1, wherein said control circuit outputs said first and second control signals.

4. The antenna switch circuit according to claim 1, wherein said antenna switch circuit is composed of a single-chip semiconductor integrated circuit that is integrated on a semi-insulating substrate.

5. A high frequency module comprising:
a transmitting circuit that outputs a transmitting signal;
a receiving circuit that receives a receiving signal from an antenna terminal; and
an antenna switch circuit that supplies said transmitting signal received from said transmitting circuit to said antenna terminal during transmission and supplies said receiving signal received from said antenna terminal to said receiving circuit,
wherein said antenna switch circuit comprises:
a first signal line to transmit said transmitting signal received at a transmitting terminal to said antenna terminal and to transmit said receiving signal received at the antenna terminal to a receiving terminal;
a first switch that is connected to the first signal line between the transmitting terminal and the antenna terminal;
a second switch that is connected to the first signal line between the receiving terminal and the antenna terminal;
a second signal line to transmit a first control signal that controls the turning on and off of said first switch; and
a third signal line to transmit a second control signal that controls the turning on and off of said second switch,
wherein at least one of said second and third signal lines crosses the first signal line,
wherein in at least one of said second and third signal lines, a first resistive element is disposed on a first side of a cross point with said first signal line and a second resistive element is disposed on a second side of the cross point, the second resistive element being disposed between the cross point and a control circuit that outputs the corresponding one of the first and second control signals, and
wherein the at least one of said second and third signal lines that are crossing with said first signal line includes a conductive path through said first and second resistive elements.

6. The high frequency module according to claim 5, wherein said first and second switches are composed of field effect transistors.

7. The high frequency module according to claim 5, wherein said control circuit outputs said first and second control signals.

8. The high frequency module according to claim 5, wherein said antenna switch is composed of a single-chip semiconductor integrated circuit that is integrated on a semi-insulating substrate.

9. The antenna switch circuit according to claim 1, wherein the first and second resistive elements are disposed in series with each other.

10. The high frequency module according to claim 5, wherein the first and second resistive elements are disposed in series with each other.

* * * * *